(12) United States Patent
Feng et al.

(10) Patent No.: US 7,746,676 B2
(45) Date of Patent: Jun. 29, 2010

(54) CHARGE PUMP

(75) Inventors: Wei-Wen Feng, Hsinchu (TW);
Wen-Yen Lee, Hsinchu (TW)

(73) Assignee: Fitipower Integrated Technology, Inc., Miaoli County (TW)

( * ) Notice: Subject to any disclaimer, the term of this patent is extended or adjusted under 35 U.S.C. 154(b) by 295 days.

(21) Appl. No.: 11/933,885

(22) Filed: Nov. 1, 2007

(65) Prior Publication Data

US 2008/0157734 A1 Jul. 3, 2008

(30) Foreign Application Priority Data

Dec. 27, 2006 (TW) .............................. 95149076 A (51) Int. Cl.
*H02M 3/18* (2006.01)
*G05F 1/40* (2006.01)
(52) U.S. Cl. ....................................... 363/60; 323/282
(58) Field of Classification Search .................... 363/59, 363/60; 323/282, 285; 327/535, 536
See application file for complete search history.

(56) References Cited

U.S. PATENT DOCUMENTS

| 4,812,961 | A  | * | 3/1989 | Essaff et al. ................... 363/61 |
| 6,201,717 | B1 | * | 3/2001 | Grant .......................... 363/60 |
| 6,411,531 | B1 |   | 6/2002 | Nork et al. |
| 6,438,005 | B1 | * | 8/2002 | Walter ......................... 363/60 |
| 2008/0079393 | A1 | * | 4/2008 | Spartano et al. ............. 320/110 |

* cited by examiner

*Primary Examiner*—Matthew V Nguyen
(74) *Attorney, Agent, or Firm*—Jeffrey T. Knapp (57) ABSTRACT

A charge pump includes a first capacitor, a first switch with adjustable on-state resistance, a second switch, a third switch, a fourth switch, a feedback loop, and an oscillator. The first switch is coupled between a first electrode of the first capacitor and an output node. The second switch is coupled between a second electrode of the capacitor and ground. The third switch is coupled between an input node and the second electrode of the capacitor. The fourth switch with adjustable on-state resistance is coupled between the input node and the first electrode of the capacitor. The feedback loop monitors a regulated voltage of the output node and generates a control signal to regulate resistances of the first, fourth switches. The oscillator generates a first and second pulse signals to switch the open and close states of the first, third switches and the second, fourth switches, respectively.

12 Claims, 6 Drawing Sheets

CHARGE PUMP

BACKGROUND

1. Technical Field

The present invention relates to a charge pump, and particularly to a charge pump for converting a voltage at an input node into a regulated voltage and outputting the regulated voltage.

2. Discussion of Related Art

Figure 6:
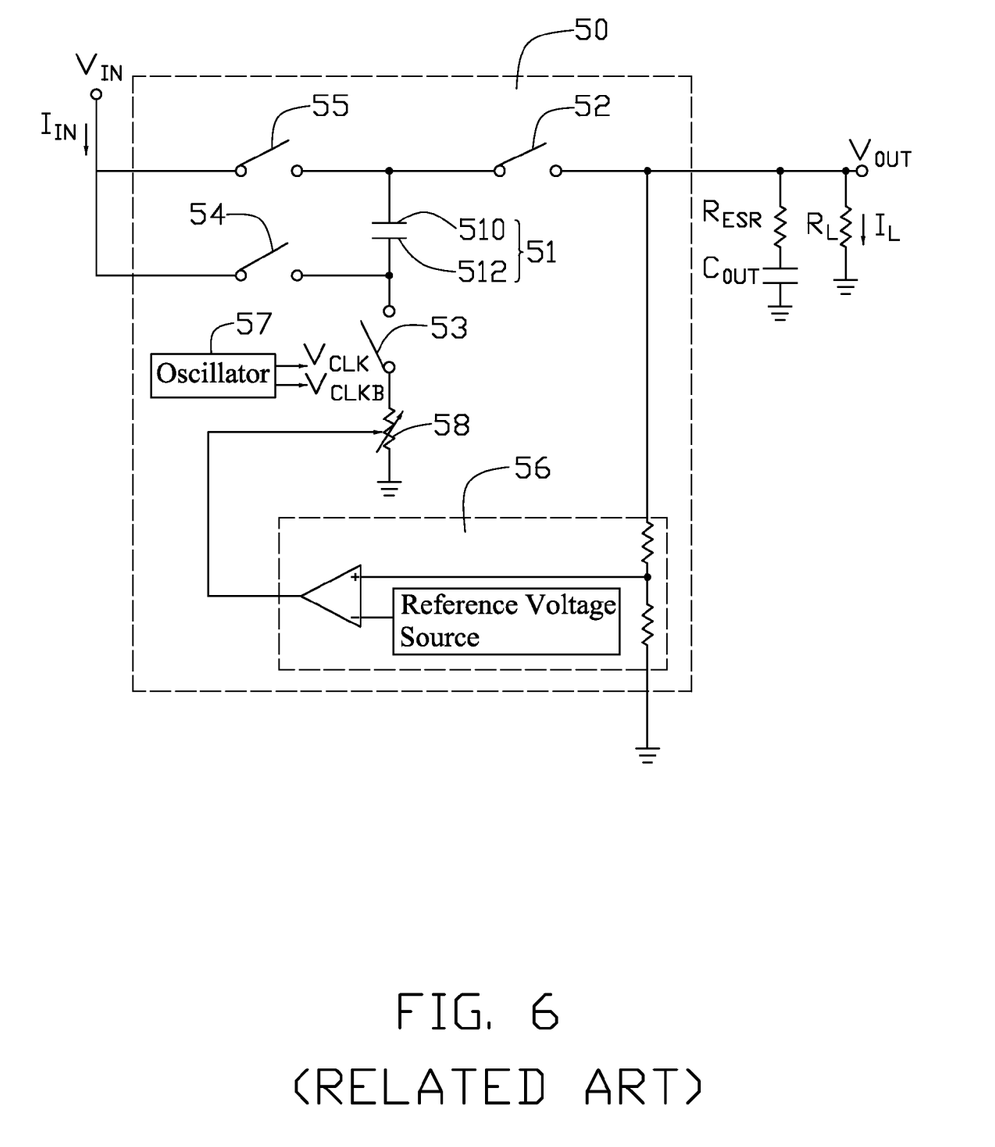
FIG. 6 is a schematic view of a conventional charge pump.

A charge pump is a kind of power supply circuit for converting a voltage at an input node into a regulated voltage and outputting the regulated voltage to loads. Referring to FIG. 6, a common charge pump 50 includes: a capacitor 51, a first switch 52 coupled between a first electrode 510 of the capacitor 51 and an output node $V_{OUT}$, a second switch 53 and an adjustable resistor 58 both of which are coupled in series between a second electrode 512 of the capacitor 51 and ground, a third switch 54 coupled between the second electrode 512 of the capacitor 51 and an input node $V_{IN}$, a fourth switch 55 coupled between the first electrode 510 of the capacitor 51 and the input node $V_{IN}$, a feed back loop 56 for monitoring a voltage at the output node $V_{OUT}$, and an oscillator 57 for respectively controlling open/close states of the first switch 52, the second switch 53, the third switch 54 and the fourth switch 55.

By switching open/close states of the switches, the charge pump 50 is alternatively charged and discharged, thereby the output node $V_{OUT}$ outputs a voltage which is 2 times the voltage at the input node $V_{IN}$.

However, noises will be induced on incoming current $I_{IN}$ during the switching of open/close states, which leads to fluctuation of the incoming current $I_{IN}$ and instability of the outputting voltage.

Therefore, what is needed is a charge pump having reduced noises on the incoming current $I_{IN}$ and stable outputting voltage.

SUMMARY

In one embodiment of the present invention, a charge pump for converting a voltage at an input node into a regulated voltage and outputting the regulated voltage at an output node is provided, the charge pump including: a first capacitor; a first switch with adjustable on-state resistance coupled between a first electrode of the first capacitor and the output node; a second switch coupled between a second electrode of the capacitor and ground; a third switch coupled between the input node and the second electrode of the capacitor, the third switch having an open and close state that matches the open and close state of the first switch, respectively; a fourth switch with adjustable on-state resistance coupled between the input node the first electrode of the capacitor, the fourth switch having an open and close state that matches the open and close state of the second switch, respectively; a feedback loop configured for monitoring the regulated voltage of the output node and thereby generating a control signal to regulate resistances of the first and the fourth switches; an oscillator for generating a first and second pulse signals to switch the open/close states of the first, third switches and the second, fourth switches, respectively.

Detailed features of the present charge pump will become more apparent from the following detailed description and the accompanying drawings.

BRIEF DESCRIPTION OF THE DRAWINGS

Many aspects of the present charge pump can be better understood with reference to the following drawings. The components in the drawings are not necessarily drawn to scale, the emphasis instead being placed upon clearly illustrating the principles of the present charge pump. Moreover, in the drawings, like reference numerals designate corresponding parts throughout the several views, wherein.

DETAILED DESCRIPTION OF THE PREFERRED EMBODIMENTS

Reference will now be made to the drawings to describe the preferred embodiments of the charge pump, in detail.

Figure 1:
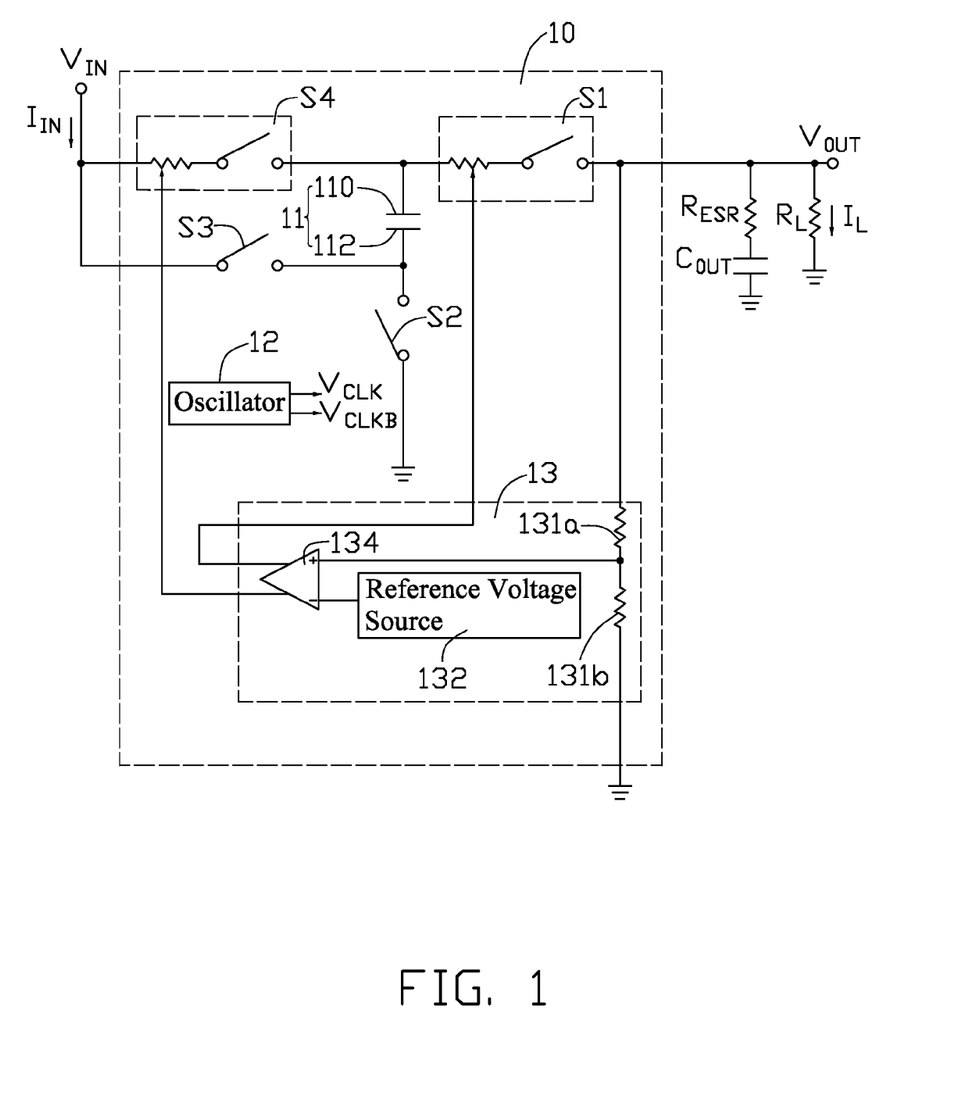
FIG. 1 is a schematic view of a charge pump according to a first exemplary embodiment.

Referring now particularly to FIG. 1, a charge pump 10 according to a first exemplary embodiment of the present invention is shown. The charge pump 10 comprises a capacitor 11, an oscillator 12, a first switch S1, a second switch S2, a third switch S3, a fourth switch S4 and a feedback loop 13.

The capacitor 11 comprises a first electrode 110 and a second electrode 12.

The oscillator 12 is configured for generating pulse signals $V_{CLK}$ and $V_{CLKB}$ (see FIG. 3) which are used to respectively switch open/close states of the first switch S1, the second switch S2, the third switch S3 and the fourth switch S4.

The first switch S1 is coupled between the first electrode 110 of the capacitor 11 and the output node $V_{OUT}$. The first switch S1 has an adjustable on-state resistance.

The second switch S2 is coupled between the second electrode 112 of the capacitor 11 and the ground.

The third switch S3 is coupled between the input node $V_{IN}$ and the second electrode 112 of the capacitor 11. The third switch S3 has an open state and a close state that match the open and close states of the first switch S1, respectively.

The fourth switch S4 is coupled between the input node $V_{IN}$ and the first electrode 110 of the capacitor 11. The fourth switch S4 has an open state and a close state that match the open and close states of the second switch S2, respectively. The fourth switch S4 has adjustable on-state resistance.

The feedback loop 13 is configured for adjusting the resistance of the first switch S1 and the fourth switch S4, and therefore controlling the current $I_{IN}$ to the capacitor 11 and the current $I_L$ though a load $R_L$, thereby regulating the voltage $V_{OUT}$ at the output node $V_{OUT}$. The feedback loop 13 includes resistors 131a, 131b, a reference voltage source 132 and a comparator 134. The resistors 131a and 131b are connected in series and coupled between the output node $V_{OUT}$ and ground. A non-inverting input port of the comparator 134 is connected to a node between the resistors 131a and 131b, and thereby a feedback voltage is provided to the non-inverting input port of the comparator 134. The reference voltage source 132 provides a reference voltage to an inverting input port of the comparator 134. The comparator 134 compares the feedback voltage with the reference voltage, and thereby outputs a control signal at an output port to adjust the resistances of the first and fourth switches S1, S4.

When the $V_{CLK}$ is LOW and the $V_{CLKB}$ is HIGH, the second switch S2 and the fourth switch S4 are closed, the first switch S1 and the third switch S3 are opened. An inputting current $I_{IN}$ flows from the input node $V_{IN}$ to the capacitor 11, and the capacitor 11 is charged thereby.

When the $V_{CLK}$ is HIGH and the $V_{CLKB}$ is LOW, the second switch S2 and the fourth switch S4 are opened, the first switch S1 and the third switch S3 are closed. An inputting current $I_{IN}$ flows from the input node $V_{IN}$ to the capacitor 11, and the capacitor 11 discharges to the output node $V_{OUT}$.

When the current of the load $I_L$ fluctuates to be less than an average value, redundant charges will be restored in the capacitor 11 and thereby make the output voltage $V_{OUT}$ raise. The comparator 134 receives feedback voltage signals and generates a control signal to augment the resistance of the first switch S1 in order to make the output voltage $V_{OUT}$ reduce to the average value.

Figure 2:
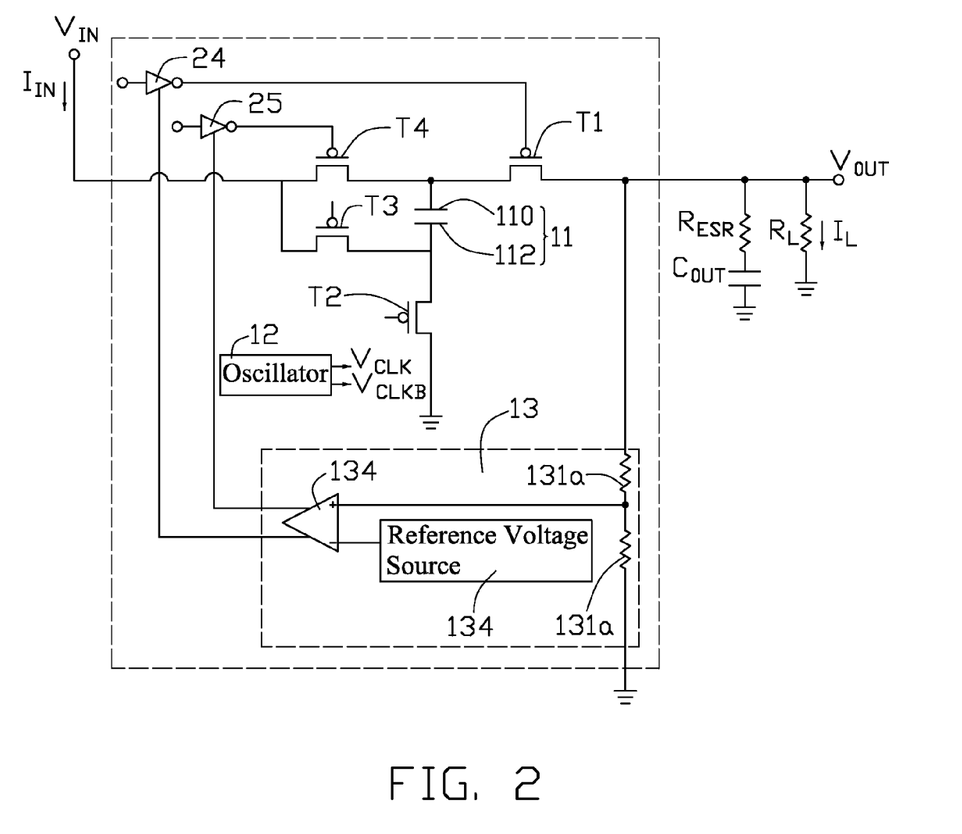
FIG. 2 is a schematic view of a charge pump according to a second exemplary embodiment.

Referring now to FIG. 2, a charge pump 20 according to a second embodiment of the present invention is shown. The charge pump 20 includes a capacitor 11, an oscillator 12, a first field effect transistor T1, a second field effect transistor T2, a third field effect transistor T3, a fourth field effect transistor T4, a feedback loop 13, and inverters 24 and 25.

The oscillator 12 is configured for generating pulse signals $V_{CLK}$ and $V_{CLKB}$ (shown in FIG. 3) which are used to respectively switch open/close states of the first, third switches and the second, fourth switches. The pulse signals $V_{CLK}$ and $V_{CLKB}$ are out of phase with each other. Preferably, the pulse signals $V_{CLK}$ and $V_{CLKB}$ comprise brief blanking intervals when both pulse signals are low and all four switches are open (e.g., between times t2 and t3).

The first field effect transistor T1 and the inverter 24 cooperatively form a switch with adjustable on-state resistance. The first field effect transistor T1 can be a p-channel metal-oxide-semiconductor field effect transistor. A source electrode of the first field effect transistor T1 is coupled to the first electrode 110, and a drain electrode of the first field effect transistor T1 is coupled to the output node $V_{OUT}$. A gate electrode of the first field effect transistor T1 is coupled to an output port of the inverter 24. The inverter 24 further comprises an input port and an enable port. The input port of the inverter 24 is coupled to the oscillator 12 for receiving the pulse signal $V_{CLK}$, and the enable port of the inverter 24 is coupled to the output port of the comparator 134 for receiving the control signal from the comparator 134. It is to be noted that, the source electrode of the first field effect transistor T1 can also be coupled to the output node $V_{OUT}$ instead, and then the drain electrode of the first field effect transistor T1 is correspondingly coupled to the first electrode 110.

The second field effect transistor T2 can be a p-channel metal-oxide-semiconductor field effect transistor. A source electrode of the second field effect transistor T2 is coupled to the second electrode 112, and a drain electrode of the second field effect transistor T2 is coupled to the ground. A gate electrode of the second field effect transistor T2 is coupled to the oscillator 12 for receiving the pulse signal $V_{CLKB}$. It is to be noted that, the source electrode of the second field effect transistor T2 can also be coupled to the ground, and then the drain electrode of the second field effect transistor T2 is correspondingly coupled to the second electrode 112.

The third field effect transistor T3 can be a p-channel metal-oxide-semiconductor field effect transistor. A source electrode of the third field effect transistor T3 is coupled to the input node $V_{IN}$, and a drain electrode of the third field effect transistor T3 is coupled to the second electrode 112. A gate electrode of the third field effect transistor T3 is coupled to the oscillator 12 for receiving the pulse signal $V_{CLK}$. It is to be noted that, the source electrode of the third field effect transistor T3 can also be coupled to the second electrode 112, and then the drain electrode of the second field effect transistor T3 is correspondingly coupled to the input node $V_{IN}$.

The fourth field effect transistor T4 and the inverter 25 cooperatively form a switch with adjustable on-state resistance. The fourth field effect transistor T4 can be a p-channel metal-oxide-semiconductor field effect transistor. A source electrode of the fourth field effect transistor T4 is coupled to the input node $V_{IN}$, and a drain electrode of the fourth field effect transistor T4 is coupled to the first electrode 110. A gate electrode of the fourth field effect transistor T4 is coupled to an output port of the inverter 25. The inverter 25 further comprises an input port and an enable port. The input port of the inverter 25 is coupled to the oscillator 12 for receiving the pulse signal $V_{CLKB}$, and the enable port of the inverter 25 is coupled to the output port of the comparator 134 for receiving the control signal from the comparator 134. It is to be noted that, the source electrode of the fourth field effect transistor T4 can also be coupled to the first electrode 110, and then the drain electrode of the fourth field effect transistor T4 is correspondingly coupled to the input node $V_{IN}$.

The feedback loop 13 is configured for respectively outputting a controlling signal to the enable ports of the inverters 24 and 25. Thereafter, the inverter 24 outputs a voltage signal to the gate electrode of the first field effect transistor T1 to adjust the resistance between the drain electrode and the source electrode of the first field effect transistor T1, and the inverter 25 outputs a voltage signal to the gate electrode of the fourth field effect transistor T4 to adjust the resistance between the drain electrode and the source electrode of the fourth field effect transistor T4. Therefore, the current $I_{IN}$ flowing to the capacitor 11 and the current $I_L$ flowing through the load $R_L$ are controlled indirectly by the feedback loop 13, and then the voltage $V_{OUT}$ at the output node $V_{OUT}$ is regulated. The feedback loop includes resistors 131a, 131b, a reference voltage source 132 and a comparator 134. The resistors 131a and 131b are connected in series and coupled between the output node $V_{OUT}$ and ground, and thereby provide a feedback voltage to the non-inverting input port of the comparator 134. The reference voltage source 132 provides a reference voltage to an inverting input port of the comparator 134. The comparator 134 compares the feedback voltage with the reference voltage, and thereafter outputs a control signal to the enable ports of inverters 24 and 25.

Figure 3:
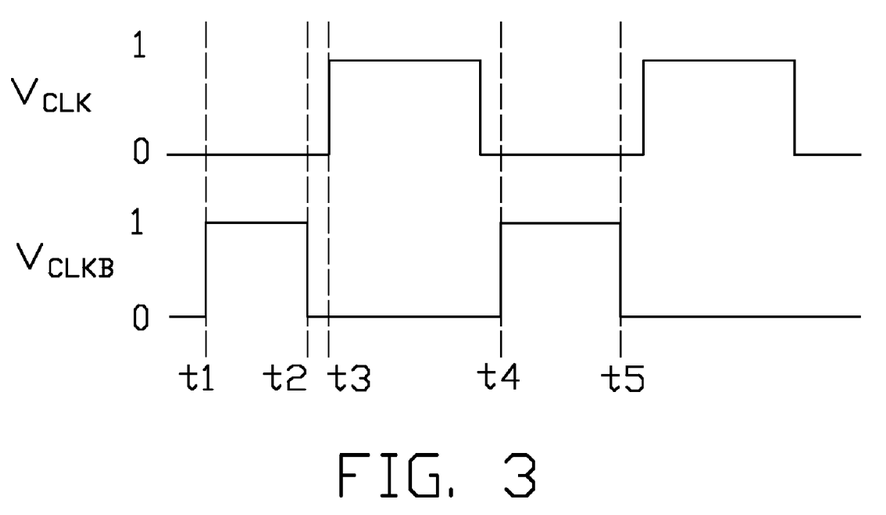
FIG. 3 is a graph of input pulse signals for applying to the charge pump of FIG. 2.

Referring to FIG. 3, the working process of charge pump 20 is described as follow:

Between time t1 and t2, $V_{CLK}$ is LOW and the $V_{CLKB}$ is HIGH. The first field effect transistor T1 and the third field effect transistor T3 are OFF, and the second field effect transistor T2 and the fourth field effect transistor T4 are ON. The input current $I_{IN}$ flows from the input node $V_{IN}$ charging up the capacitor 11, and a voltage of the capacitor 11 equal to a voltage at the input node $V_{IN}$.

Between time t2 and t3, both of $V_{CLK}$ and $V_{CLKB}$ are LOW. The first field effect transistor T1, the second field effect transistor T2, the third field effect transistor T3 and the fourth field effect transistor T4 are OFF.

Between time t3 and t4, $V_{CLK}$ is HIGH and the $V_{CLKB}$ is LOW. The first field effect transistor T1 and the third field effect transistor T3 are ON, and the second field effect transistor T2 and the fourth field effect transistor T4 are OFF. Current flows from input node $V_{IN}$ through the third field effect transistor T3 to capacitor 11, and from capacitor 11 through the first field effect transistor T1 to output node $V_{OUT}$.

Between time t2 and t3, both of $V_{CLK}$ and $V_{CLKB}$ are LOW. The first field effect transistor T1, the second field effect transistor T2, the third field effect transistor T3 and the fourth field effect transistor T4 are OFF.

By alternatively controlling the first field effect transistor T1, the second field effect transistor T2, the third field effect transistor T3 and the fourth field effect transistor T4 to ON and OFF, the capacitor 11 is alternatively charged and discharged, thereby the output node $V_{OUT}$ outputs a voltage equal to a sum of the voltage at the input node $V_{IN}$ and the voltage of the capacitor 11, thereby the voltage at the output node $V_{OUT}$ is 2 times the voltage at the input node $V_{IN}$ to the load.

When the current through load $I_L$ is less than the average output, charge stored in the capacitor 11 will increase and the voltage at the output node $V_{OUT}$ will raise, further lead to rise of the feedback voltage provided to the comparator 134. The comparator 134 compares the feedback voltage with the reference voltage, and thereafter outputs a control signal to the enable ports of inverters 24 and 25, so as to respectively raise the resistance between the drain electrode and the source electrode of the first field effect transistor T1, and the resistance between the drain electrode and the source electrode of the fourth field effect transistor T4 by controlling the gate electrodes of the first field effect transistor T1 and the fourth field effect transistor T4, thereby bring down the output voltage at the output node $V_{OUT}$.

Similarly, when the current through load $I_L$ is greater than the average output, the charge pump 20 will bring down the resistance between the drain electrode and the source electrode of the first field effect transistor T1, and the resistance between the drain electrode and the source electrode of the fourth field effect transistor T4 by controlling the gate electrodes of the first field effect transistor T1 and the fourth field effect transistor T4, thereby raise the output voltage at the output node $V_{OUT}$.

Figure 4:
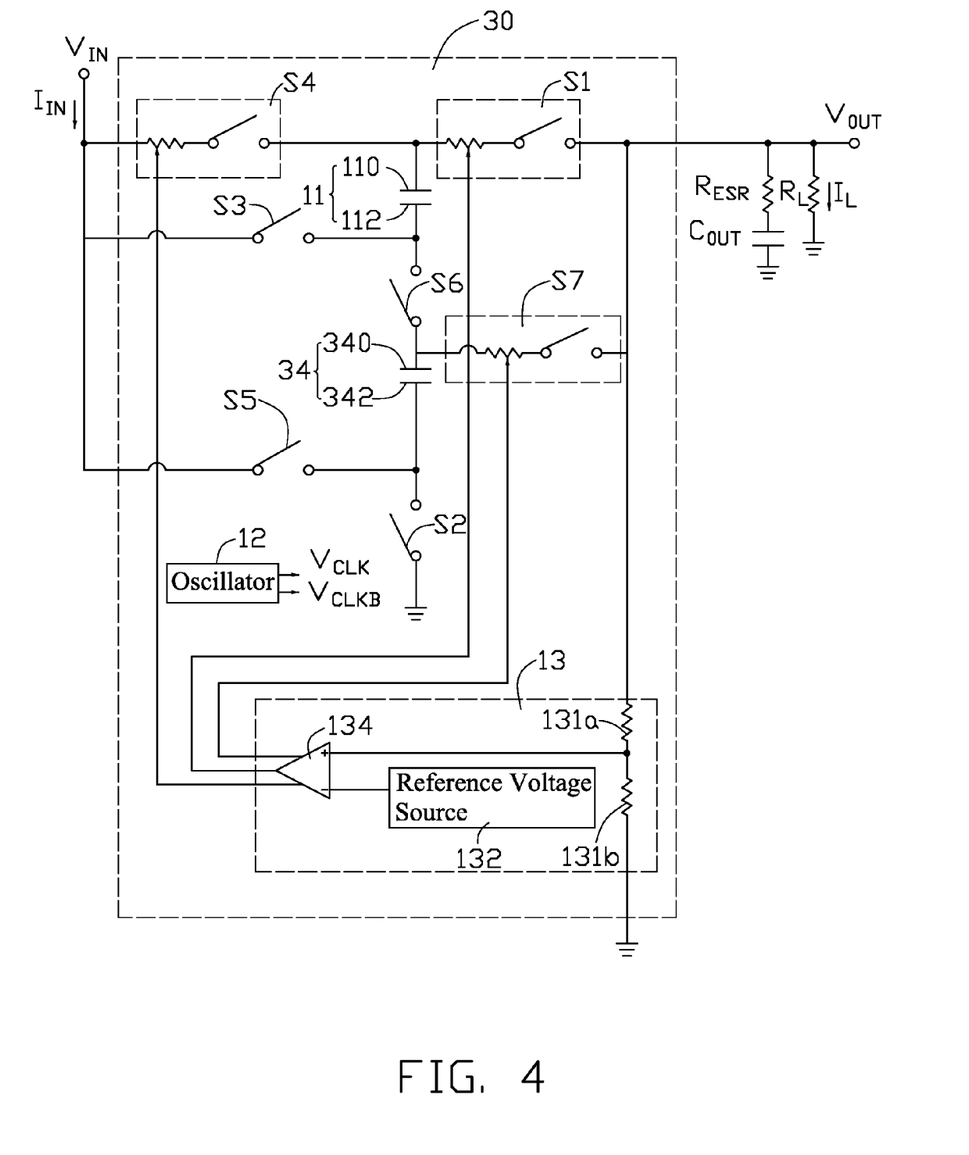
FIG. 4 is a schematic view of a charge pump according to a third exemplary embodiment.

Referring now to FIG. 4, where a charge pump 30 according to a third embodiment of the present invention is shown. The configuration of charge pump 30 is generally similar to the above-mentioned charge pump 10. What's different is that, the charge pump 30 further comprises a fifth switch S5, a sixth switch S6, a seventh switch S7 and capacitor 34.

The capacitor 34 includes a first electrode 340 and a second electrode 342. The capacitor 34 is coupled to the sixth switch S6 in series and disposed between the capacitor 11 and second switch S2. The fifth switch S5 is coupled between the input node $V_{IN}$ and the second electrode 342 of the capacitor 34. The seventh switch S7 is coupled between the first electrode 340 of the capacitor 34 and the output node $V_{OUT}$. The fifth switch S5 and the seventh switch S7 have an open state and a close state that can be switched by pulse signal $V_{CLK}$ of oscillator 12. The sixth switch S6 have an open state and a close state that can be switched by pulse signal $V_{CLKB}$ of oscillator 12. When switches S2, S4, S6 are closed and switches S1, S3, S5, S7 are opened, the capacitors 11 and 34 will be charged and each of the capacitors 11 and 34 has a voltage 0.5 times the voltage at the input node $V_{IN}$. When switches S2, S4, S6 are opened and switches S1, S3, S5, S7 are closed, the capacitors 11 and 34 will be discharged. Thereby, there will be a voltage at the output node $V_{OUT}$ that equal to a sum of the voltage at the input node $V_{IN}$ and the voltage of the capacitor 11 (or the voltage of the capacitor 34), thereby the voltage at the output node $V_{OUT}$ is 1.5 times the voltage at the input node $V_{IN}$ to the load. It is to be noted that, the location of the switch S6 and the capacitor 34 can be interchanged without interfering the normal working of the charging pump 30.

Figure 5:
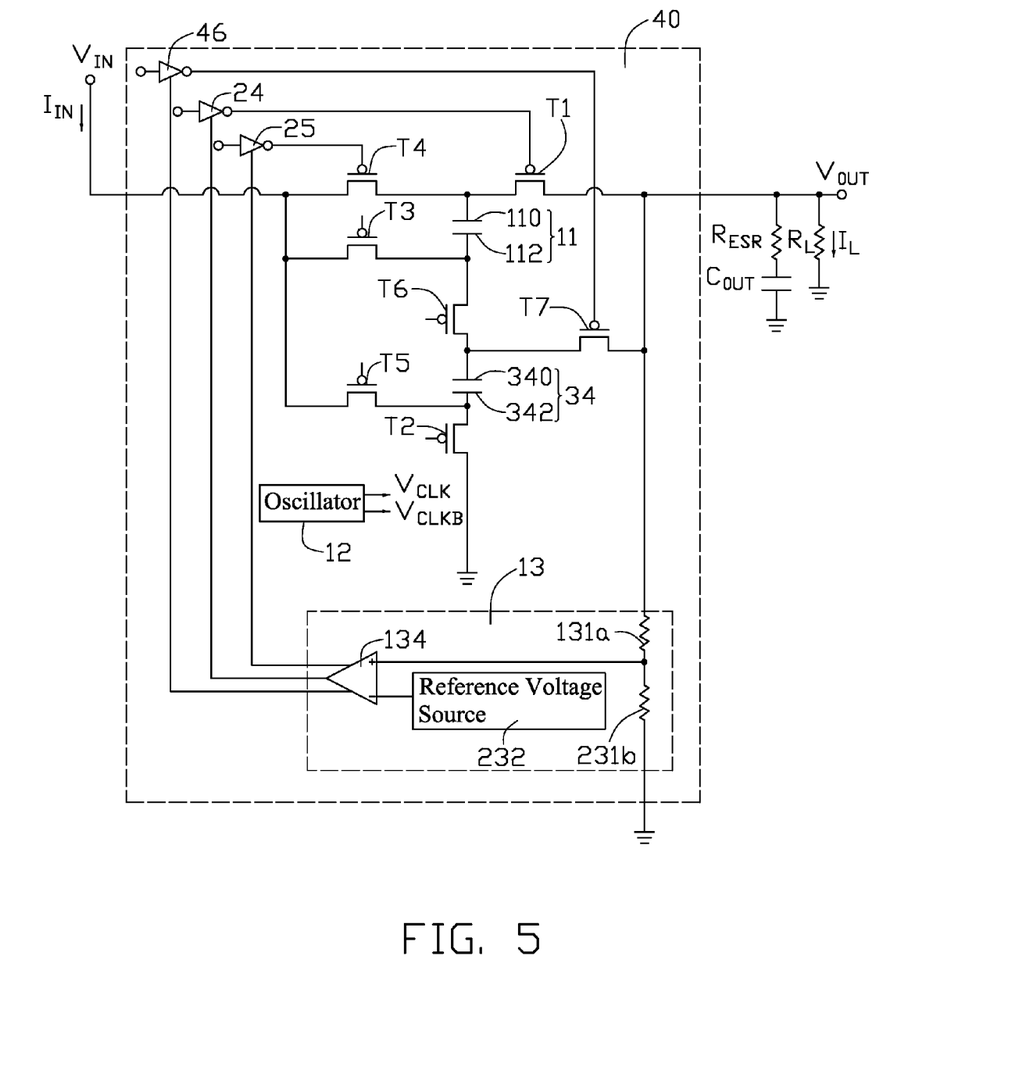
FIG. 5 is a schematic view of a charge pump according to a fourth exemplary embodiment.

Referring now to FIG. 5, where a charge pump 40 according to a fourth embodiment of the present invention is shown. The configuration of charge pump 40 is generally similar to the above-mentioned the charge pump 20. The difference between the charge pump 20 and 40 is that, the charge pump 40 further comprises a fifth field effect transistor T5, a sixth field effect transistor T6, a seventh field effect transistor T7, a capacitor 34 with a first electrode 340 and a second electrode 342, and an inverter 46.

The fifth field effect transistor T5 can be a p-channel metal-oxide-semiconductor field effect transistor. A source electrode of the fifth field effect transistor T5 is coupled to the second electrode 342 of the capacitor 34, and a drain electrode of the fifth field effect transistor T5 is coupled to the input node $V_{IN}$. A gate electrode of the fifth field effect transistor T5 is coupled to the oscillator 12 for receiving the pulse signal $V_{CLK}$. It is to be noted that, the source electrode of the fifth field effect transistor T5 can also be coupled to the input node $V_{IN}$, and then the drain electrode of the fifth field effect transistor T5 is correspondingly coupled to the second electrode 342 of the capacitor 34.

The sixth field effect transistor T6 can be a p-channel metal-oxide-semiconductor field effect transistor. A source electrode of the sixth field effect transistor T6 is coupled to one of the second electrode 112 of the capacitor 11 and the first electrode 340 of the capacitor 34, and a drain electrode of the sixth field effect transistor T6 is coupled to the other. A gate electrode of the sixth field effect transistor T6 is coupled to the oscillator 12 for receiving the pulse signal $V_{CLKB}$.

The seventh field effect transistor T7 and the inverter 46 cooperatively form a switch with adjustable on-state resistance. The seventh field effect transistor T7 can be a p-channel metal-oxide-semiconductor field effect transistor. A source electrode of the seventh field effect transistor T7 is coupled between the sixth field effect transistor T6 and the output node $V_{OUT}$. A gate electrode of the seventh field effect transistor T7 is coupled to an output port of the inverter 46. The inverter 46 further comprises an input port and an enable port. The input port of the inverter 46 is coupled to the oscillator 12 for receiving the pulse signal $V_{CLK}$, and the enable port of the inverter 46 is coupled to the output port of the comparator 134 for receiving the control signal from the comparator 134.

The charge pumps 10, 20, 30 and 40 monitor voltage changes and generate controlling signals by the feedback loop 13, thereafter regulating resistance of the switches with adjustable on-state resistance and further regulating voltage at the output node $V_{OUT}$. The above-mentioned charge pumps have function of regulating a fluctuation of the incoming current $I_{IN}$ and stabilizing the outputting voltage. The switches with adjustable on-state resistance also make the above-mentioned charge pumps have small scale and low cost.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A charge pump for converting a voltage at an input node into a regulated voltage and outputting the regulated voltage at an output node, the charge pump comprising:
a first capacitor;
a first switch with adjustable on-state resistance coupled between a first electrode of the first capacitor and the output node;
a second switch coupled between a second electrode of the capacitor and ground;
a third switch coupled between the input node and the second electrode of the capacitor, the third switch having an open state and a close state that match the open and close states of the first switch, respectively;
a fourth switch with adjustable on-state resistance coupled between the input node and the first electrode of the capacitor, the fourth switch having an open state and a close state that match the open and close states of the second switch, respectively;
a feedback loop configured for monitoring the regulated voltage of the output node; and
an oscillator for generating a first and a second pulse signals to switch the open and close states of the first, third switches and the second, fourth switches, respectively;
wherein the first and the fourth switches each comprises an inverter and a field effect transistor; an input port of the inverter is connected to the oscillator to receive the first or second pulse signal, an enable port of the inverter is connected to an output port of the comparator, an output port of the inverter is connected to a gate electrode of the field effect transistor; the field effect transistor of the first switch comprises a source electrode connected to the first electrode of the first capacitor, and a drain electrode connected to the output node; the fourth switch comprises a source electrode connected to the second electrode of the first capacitor; and a drain electrode connected to ground.

2. The charge pump according to claim 1, wherein the feedback loop comprises a first resistor, a second resistor, a reference voltage source and a comparator having a non-inverting input port and an inverting input port, the first and second resistors provide a feedback voltage at the non-inverting input port, the reference voltage source provides a reference voltage at the inverting input port, the comparator compares the feedback voltage and the reference voltage and thereby generates a control signal to regulate resistances of the first and the fourth switches.

3. The charge pump according to claim 2, wherein the first resistor and the second resistor are connected in series and coupled between the output node and ground, the non-inverting input port of the comparator is connected to a node between the first resistor and the second resistor.

4. The charge pump according to claim 1, wherein the field effect transistors are p-channel metal-oxide-semiconductor field effect transistors.

5. The charge pump according to claim 1, wherein the charge pump further comprises a second capacitor, a fifth switch, a sixth switch and a seventh switch, the second capacitor and the sixth switch are connected in series and coupled between the first capacitor and the second switch, the fifth switch is coupled between the input node and a second electrode of the second capacitor, the open and close states of the fifth and seventh switches can be controlled by the first pulse signal, the seventh switch has an adjustable on-state resistance and is coupled between the output node and a node between the first and second capacitor, the sixth switch has an adjustable on-state resistance and the open and close states of the sixth switch can be controlled by the second pulse signal.

6. The charge pump according to claim 5, wherein the seventh switch comprises an inverter and a field effect transistor, an input port of the inverter is connected to the oscillator to receive the first pulse signal, an enable port of the inverter is connected to an output port of the comparator, an output port of the inverter is connected to a gate electrode of the field effect transistor, the field effect transistor of the seventh switch comprises a source electrode and a drain electrode, the source electrode of the field effect transistor is connected to the first electrode of the second capacitor and the drain electrode of the field effect transistor is connected to the output node.

7. The charge pump according to claim 6, wherein the field effect transistors are p-channel metal-oxide-semiconductor field effect transistors.

8. A charge pump for converting a voltage at an input node into a regulated voltage and outputting the regulated voltage at an output node, the charge pump comprising:
a first capacitor;
a first switch with adjustable on-state resistance coupled between a first electrode of the first capacitor and the output node;
a second switch coupled between a second electrode of the capacitor and ground;
a third switch coupled between the input node and the second electrode of the capacitor, the third switch having an open state and a close state that match the open and close states of the first switch, respectively;
a fourth switch with adjustable on-state resistance coupled between the input node and the first electrode of the capacitor, the fourth switch having an open state and a close state that match the open and close states of the second switch, respectively;
a feedback loop configured for monitoring the regulated voltage of the output node;
an oscillator for generating a first and a second pulse signals to switch the open and close states of the first, third switches and the second, fourth switches, respectively;
a second capacitor,
a fifth switch coupled between the input node and a second electrode of the second capacitor;
a sixth switch having an adjustable on-state resistance, the second capacitor and the sixth switch being connected in series and coupled between the first capacitor and the second switch; and
a seventh switch coupled between the output node and a node between the first and second capacitor, the seventh switch having an adjustable on-state resistance;
wherein the open and close states of the fifth and seventh switches can be controlled by the first pulse signal, and the open and close states of the sixth switch can be controlled by the second pulse signal.

9. The charge pump according to claim 8, wherein the seventh switch comprises an inverter and a field effect transistor, an input port of the inverter is connected to the oscillator to receive the first pulse signal, an enable port of the inverter is connected to an output port of the comparator, an output port of the inverter is connected to a gate electrode of the field effect transistor, the field effect transistor of the seventh switch comprises a source electrode and a drain electrode, the source electrode of the field effect transistor is connected to the first electrode of the second capacitor and the drain electrode of the field effect transistor is connected to the output node.

10. The charge pump according to claim 9, wherein the field effect transistors are p-channel metal-oxide-semiconductor field effect transistors.

11. The charge pump according to claim 8, wherein the feedback loop comprises a first resistor, a second resistor, a reference voltage source and a comparator having a non-inverting input port and an inverting input port, the first and second resistors provide a feedback voltage at the non-inverting input port, the reference voltage source provides a reference voltage at the inverting input port, the comparator compares the feedback voltage and the reference voltage and thereby generates a control signal to regulate resistances of the first and the fourth switches.

12. The charge pump according to claim 11, wherein the first resistor and the second resistor are connected in series and coupled between the output node and ground, the non-inverting input port of the comparator is connected to a node between the first resistor and the second resistor.

* * * * *